United States Patent
Karyo

(10) Patent No.: US 6,968,778 B2
(45) Date of Patent: Nov. 29, 2005

(54) GARLIC PEELER

(75) Inventor: Michael Karyo, New York, NY (US)

(73) Assignee: Siliconezone USA, LLC., New York, NY (US)

( * ) Notice: Subject to any disclaimer, the term of this patent is extended or adjusted under 35 U.S.C. 154(b) by 0 days.

(21) Appl. No.: 10/652,977

(22) Filed: Aug. 28, 2003

(65) Prior Publication Data

US 2005/0044716 A1 Mar. 3, 2005

(51) Int. Cl.⁷ ................................. A23L 1/10
(52) U.S. Cl. ............... 99/586; 30/123.5; D7/693
(58) Field of Search ................. 30/123.5, 123.6; 99/586, 584, 587, 568; D7/693

(56) References Cited

U.S. PATENT DOCUMENTS

| | | | |
|---|---|---|---|
| 3,602,279 A | 8/1971 | Albertus | |
| 3,636,999 A | 1/1972 | Cordes | |
| 3,961,418 A * | 6/1976 | Neveu | 30/123.5 |
| 4,481,875 A | 11/1984 | Toyosato | |
| 4,998,465 A | 3/1991 | Fischer et al. | |
| 5,021,254 A | 6/1991 | Fischer et al. | |
| 5,573,803 A * | 11/1996 | Omessi | 426/483 |
| 5,715,736 A * | 2/1998 | Cherney | 83/13 |
| 5,996,483 A | 12/1999 | Yip | |
| 6,131,508 A | 10/2000 | Tsai | |
| 6,244,529 B1 | 6/2001 | Tardif et al. | |
| D462,243 S * | 9/2002 | de Groote | D7/693 |
| 2002/0153440 A1 | 10/2002 | Holcomb et al. | |

* cited by examiner

Primary Examiner—Charles Goodman
(74) Attorney, Agent, or Firm—Stephen E. Feldman, PC

(57) ABSTRACT

A device for peeling the skins off of one or more cloves of garlic is disclosed. The device has a hollow, flexible and deformable body that has an opening formed in its wall through which one or more cloves of garlic can be inserted therein.

4 Claims, 2 Drawing Sheets

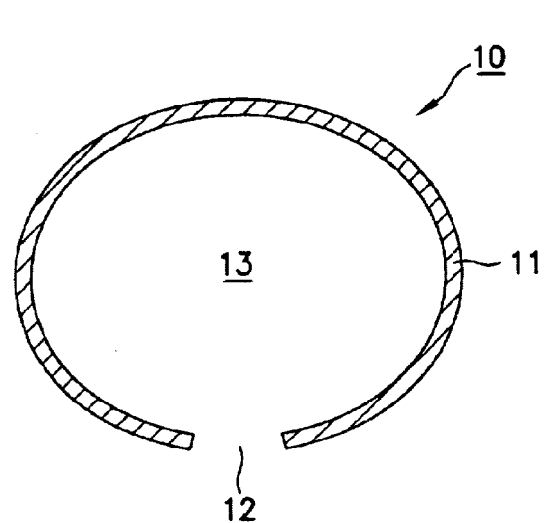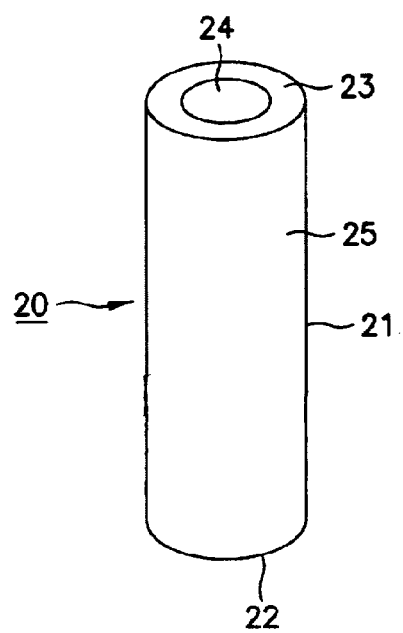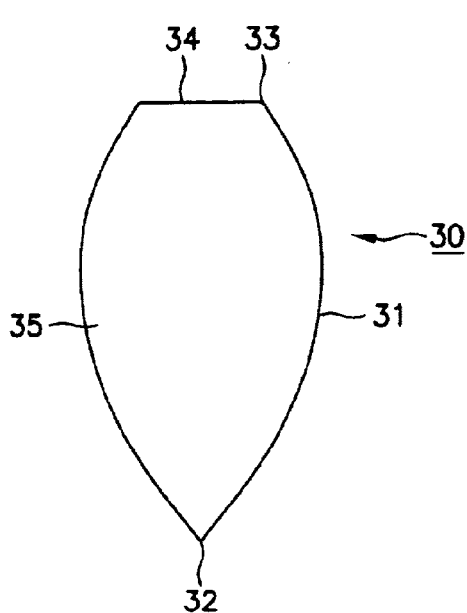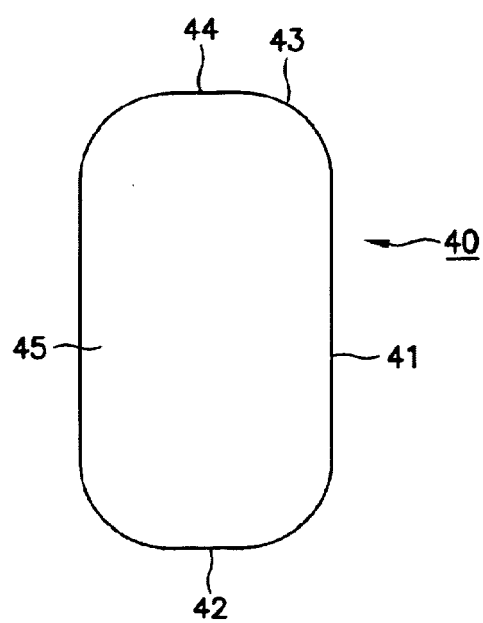
Fig. 1
Fig. 2
Fig. 3
Fig. 4

GARLIC PEELER

FIELD OF THE INVENTION

This invention is directed to a device for removing the outer skin from one or more cloves of garlic. More particularly, the device of this invention is provided in the form of a hollow body equipped with an opening through which one or more cloves of garlic can be inserted into the hollow body. Even more particularly, the device of this invention has no moving parts and is simple and economical to manufacture.

BACKGROUND OF THE INVENTION

When garlic is used in the preparation of food dishes, garlic cloves are typically removed from a head or bulb of garlic and the skin removed from each garlic clove. These skins can be removed by manually peeling the skins off of the garlic cloves or by partially crushing a garlic clove beneath a flat surface such as a knife blade and then manually peeling away the loosened garlic skin. These techniques are cumbersome and time consuming and are often very messy as the oil released from the garlic clove clings to one's fingers or the knife blade causing the removed skins to adhere to one's fingers or a knife blade thereby requiring constant cleaning.

In order to overcome this tedious and cumbersome task, garlic peeling devices have been developed that purport to simplify the removal of garlic clove skins. Illustrative of these devices are those described in the ensuing descriptions.

U.S. Pat. No. 3,602,279 to Raaij discloses a machine for skinning onions and bulb like plants that uses an insertable, cup-shaped holder spaced above a conveyor means and a blower nozzle for directing air on onions or other bulb like vegetables to remove their skins.

U.S. Pat. No. 3,636,999 to Cordes discloses a garlic bulb appendage remover having multiple sets of opposed rolls with firm resilient surfaces that engage the protruding tops and roots of the gently rotating bulbs and roots.

U.S. Pat. No. 4,481,875 to Toyosato discloses a bulb peeling apparatus that causes incised grooves to be formed on the outer peripheral surface skins of bulbs as the bulbs are rotated. Air is jetted onto the bulbs to peel off the surface skins.

U.S. Pat. Nos. 4,998,465 and 5,021,254 to Fischer, et.al. disclose an apparatus for peeling garlic wherein garlic cloves are placed on a shake table and then dropped from the shake table onto a sloped feed tray having a plurality of downwardly extending parallel troughs whereupon the garlic cloves are fed into a product cup and their skins removed by blasts of air.

U.S. Pat. No. 5,996,483 to Yip discloses a garlic peeler with an open top and a cylindrical inner wall surface upon which four ribs having respective surfaces are formed. A central beater surrounded by the cylindrical wall surface is supported for rotation about an axis. Garlic bulbs are caused to rotate and strike the rib surfaces to remove the skins.

U.S. Pat. No. 6,131,508 to Tsai discloses a garlic surface membrane stripper having a first and second body, a press rod and a press structure. The first rod is provided with a plurality of membrane stripping claws to remove the skins.

U.S. Pat. No. 6,244,529 B1 to Tardif, et.al. discloses a manually operated garlic grater having a casing, a grating drum and a removably mounted handle on the casing on top of an open end of a tubular cavity. Pressing a clove of garlic onto the drum causes the skin of a clove of garlic to be torn out by drum teeth.

US 2002/0153440 to Holcomb, et.al. discloses a hand held garlic peeler that utilizes elastomeric rods or arms that engage the garlic cloves and rub the skins off of the garlic cloves.

While the devices disclosed above generally achieve their intended purpose, it is readily appreciated that they are complex apparatus, are not always simple and easy to operate and are generally costly to manufacture.

SUMMARY OF THE INVENTION

It has now been found that the shortcomings noted above with respect to currently available garlic peeling devices are overcome with the garlic peeling device of this invention. The garlic peeling device of the invention has no moving parts, is simple and easy to use and clean and can be manufactured using conventional techniques and commercially available materials. In general, the garlic peeling device of the invention comprises a flexible and deformable hollow member having a continuous wall; and, an opening formed in the wall of said member through which one or more cloves of garlic can be inserted into the body of said member.

In one embodiment, the flexible and deformable hollow member is in the form of a sphere.

In another embodiment, the flexible and deformable hollow member is in the form of an elongated cylinder.

In still another embodiment, the flexible and deformable hollow member is in the form of a truncated football.

In further embodiment, the flexible and deformable hollow member has the form of an oval or oblong.

In still a further embodiment, the flexible and deformable hollow member is in the form of a spheroid.

In yet a further embodiment, the flexible and deformable hollow member has a bulbous shape with a neck portion protruding from its lower end.

Conventional methods and techniques known to those skilled in the art can be used to mold the flexible, deformable, hollow garlic peeler device of the invention using commercially available food grade plastic materials such as latexes, polyethylenes, polysulfones, polyurethanes, silicones, and the like.

BRIEF DESCRIPTION OF THE DRAWING

The garlic peeler device of the invention is illustrated in the accompanying drawing wherein:

FIG. 1 is a vertical view in cross section of one embodiment of the device having a geometric configuration in the form of a sphere;

FIG. 2 is a perspective view of another embodiment of the device having a geometric configuration in the form of an elongated cylinder;

FIG. 3 is an elevation view of an additional embodiment of the device having a geometric configuration in the form of a truncated football;

FIG. 4 is an elevation view of still another embodiment of the device having a geometric configuration in the form of an oval or oblong;

DETAILED DESCRIPTION OF THE DRAWING AND THE INVENTION

Figure 5:
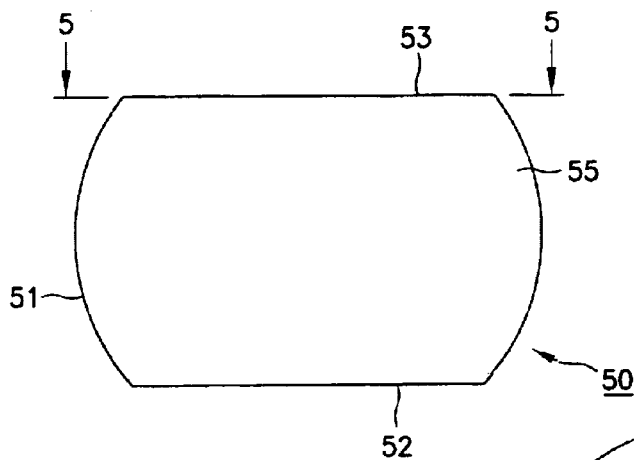
FIG. 5 is an elevation view of a further embodiment of the device having a geometric configuration in the form of a spheroid.

The garlic peeler device of the invention will become more apparent from the ensuing description when considered together with the accompanying drawing wherein like reference numerals denote like parts.

The garlic peeler device of the invention illustrated in FIG. 1 has a geometric configuration in the form of a hollow sphere 10 having a continuous wall 11 and an opening 12 formed in its wall 11 through which one or more cloves of glarlic can be inserted into the hollow body 13 of the sphere 10. Please note, the diameter of the opening 12 is substantially smaller than the diameter of the sphere 10.

in FIG. 2 the garlic peeler device is shown having a geometric configuration in the form of a hollow, elongated cylinder 20 having a continuous wall 21 and opposed ends 22 and 23. An opening 24 is provided in one end s as end 23 through which one or more cloves of garlic can be inserted into the hollow body 25 of the cylinder 20.

The embodiment of the device illustrated in FIG. 3 has a geometric configuration in the form of a truncated football 30 having a continuous wall 31 and a pointed end 32. The other end 33 is truncated; i.e., cut off, to provide an opening 34 through which one or more cloves of garlic can be inserted into the hollow body 35 of the truncated football 30

The geometric configuration of the device shown in FIG. 4 is in the form of an oval or oblong 40 having a continuous wall 41 and opposed, rounded ends 42 and 43. An opening, shown in dashed line 44, is provided in one end such as end 43 through which one or more cloves of garlic can be inserted into the hollow body 45 of the oval or oblong shaped device 40.

FIG. 5 illustrates an embodiment of the device having a geometric configuration in the form of a spheroid 50 having a continuous wall 51 and opposed flattened ends 52 and 53.

Figure 6:
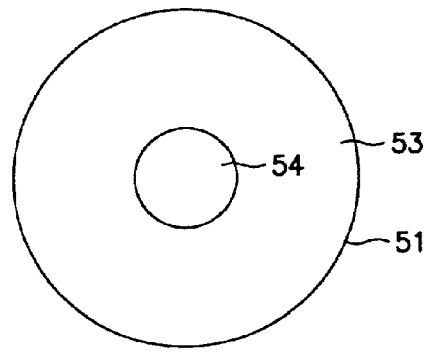
FIG. 6 is a top plan view of the device shown in FIG. 5 taken substantially on the line 5—5 of FIG. 5.

As shown in FIG. 6, an opening 54 is provided in one of the flattened ends such as end 53 through which one or more cloves of garlic can be inserted into the hollow body 55 of the spheroid 50.

Figure 7:
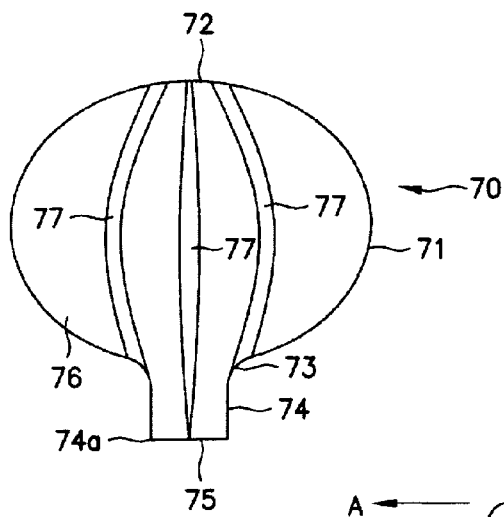
FIG. 7 is a vertical view of still a further embodiment of the device having a geometric configuration in the form of a bulb resembling the shape of a head or bulb of garlic; and, FIG. 8 is a vertical view illustrating a method of using the device of the invention.
Figure 8:
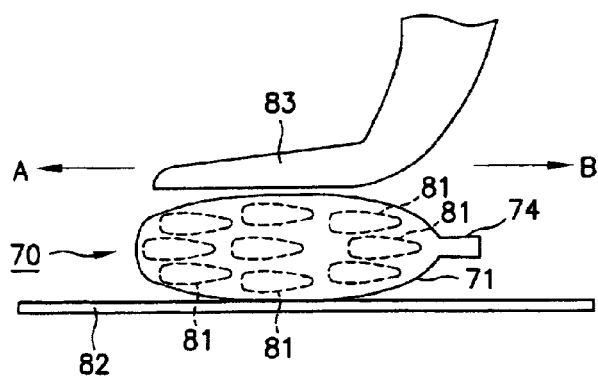

In FIG. 7 the geometric configuration of the garlic peeler device in the form of a hollow bulb 70 having a continuous wall 71, a top 72 and a bottom 73. A neck portion 74 extends downward from the bottom 73 and is provided with an opening 75 formed in the lower end 74a of the neck portion 74 to permit one or more cloves of garlic to be inserted into the hollow body 75 of the bulb 70. In this embodiment, the continuous wall 71 can be provided with a plurality of elongated grooves 77 formed on its outer surface that extend from the top 72 of the bulb 70 to the bottom 74a of the neck portion 74 so that the device resembles a head or bulb of garlic One means for using the garlic peeler device of the invention is shown in FIG. 8 wherein the device in FIG. 7 is employed for purposes of illustration. After one or more cloves of garlic, shown in phantom by reference numeral 81, have been inserted into the body of the hollow bulb 70, the bulb 70 is placed on a rigid, horizontal surface 82 such as a table, counter top, cutting board, or the like. A user then places his or her palm 83 on the continuous wall 71 of the bulb 70 spheroid 14 and exerts downward pressure so that the bulb 70 becomes deformed as shown. Maintaining this downward pressure, the user then rolls the bulb 70 along the horizontal surface 82 first in the direction of arrow A then in the direction of arrow B several times. This reciprocating motion of the bulb 70 causes the cloves of garlic 81 to abrade against one another and against the inner wall of the bulb 70 resulting in the removal of their skins. The skinned garlic cloves 81 can then be removed by shaking them out of the bulb 70 and the skins can be removed from the interior of the bulb 70 by turning it inside out. The interior of the bulb 70 can then be cleaned by washing it with warm water using a mild detergent and left in its inverted condition until it is dry.

Substantially the same technique described above can be followed using the garlic peeler devices shown in FIGS. 1–5.

The garlic peeler device of the invention can be provided in various. For example, when the device is intended for household kitchen use, it can be about one-and-a-half times the size illustrated in the embodiments of FIGS. 1, 5 and 7 and about two-and-a-half times the size of the embodiments illustrated in FIGS. 2, 4 and 4. This results in openings having diameters of approximately 0.75 inches and are in the shape of a circle. However, any shape, such as squares, rectangles, ovals, etcetera, may be used. Also, the same sizes or somewhat larger sizes can be provided for use of the device in commercial or institutional kitchens.

One method that can be used to prepare the flexible and deformable hollow garlic peeler device of the invention is to react a silicone having the formula R SiO where R is a hydrocarbon with a suitable reagent in the presence of a catalyst such as platinum, hydrogen peroxide, and the like. When the silicone is in a liquid state, it can then be poured into a mold having the desired geometric configuration and be permitted to cure in situ. After the silicone has cured, it can then be removed from the mold.

Essentially the same procedure can be followed using other food grade plastics as mentioned hereinabove.

Although the garlic peeler device of the invention has been described in some detail and with particularity, it will be appreciated by those skilled in this art that changes and modifications can be made therein without departing from the scope and spirit of the invention

What is claimed is:

1. A device for removing the skin from one or more cloves of garlic comprising:
   (a) a hollow, flexible and deformable member having a continuous wall, said member being substantially spherical and having a first diameter; and
   (b) an opening formed in said wall through which one or more cloves of garlic can be inserted into the body of said member, said opening having a second diameter, wherein said second diameter is substantially smaller than said first diameter.

2. The device of claim 1 wherein said hollow, flexible and deformable member has a geometric configuration in the form of a bulb having a top, a bottom and a neck portion extending downward from said bottom, the lower end of said neck portion having an opening formed therein.

3. The device of claim 2 wherein said bulb has a plurality of elongated grooves formed on the outer surface thereof extending from said top to the lower end of said neck portion so that said bulb resembles a head or bulb of garlic.

4. The device of claim 1 that permits a user to exert downward pressure on said hollow, flexible and deformable member while concurrently reciprocally rolling said member upon a flat rigid surface such that the skins of said garlic cloves are removed.

* * * * *